United States Patent
Tsai et al.

(10) Patent No.: US 10,153,105 B2
(45) Date of Patent: Dec. 11, 2018

(54) TOUCH-SENSITIVE LIGHT GUIDE FILM, AND GLOWING KEYBOARD AND ELECTRICAL DEVICE USING THE SAME

(71) Applicant: GLOBAL LIGHTING TECHNOLOGIES INC., Taoyuan (TW)

(72) Inventors: Chung-Lin Tsai, Taoyuan (TW); Jiun-Hau Ie, Taoyuan (TW); Hao Lu, Taoyuan (TW)

(73) Assignee: GLOBAL LIGHTING TECHNOLOGIES INC. (TW)

( * ) Notice: Subject to any disclaimer, the term of this patent is extended or adjusted under 35 U.S.C. 154(b) by 0 days.

(21) Appl. No.: 16/030,983

(22) Filed: Jul. 10, 2018

(65) Prior Publication Data

US 2018/0323020 A1 Nov. 8, 2018

Related U.S. Application Data

(63) Continuation-in-part of application No. 15/390,546, filed on Dec. 26, 2016, now Pat. No. 10,048,536.
(Continued)

(51) Int. Cl.
*F21V 8/00* (2006.01)
*G06F 3/02* (2006.01)
(Continued)

(52) U.S. Cl.
CPC .............. *H01H 13/83* (2013.01); *G02B 6/002* (2013.01); *G02B 6/005* (2013.01); *G06F 3/0202* (2013.01);
(Continued)

(58) Field of Classification Search
CPC .. H01H 13/83; H01H 13/703; H01H 2209/06; H01H 2239/022; G02B 6/002; G02B 6/005; G06F 3/0202
See application file for complete search history.

(56) References Cited

U.S. PATENT DOCUMENTS 9,004,737 B2 * 4/2015 Tsai ................... G02B 6/0083
362/630
2006/0290685 A1 * 12/2006 Nagakubo ............ G02B 6/0068
345/175
(Continued)

OTHER PUBLICATIONS

Notice of Allowance dated Apr. 12, 2018 for U.S. Appl. No. 15/390,546.

*Primary Examiner* — Mary Ellen Bowman
(74) *Attorney, Agent, or Firm* — Schmeiser, Olsen & Watts, LLP (57) ABSTRACT

A touch-sensitive light guide film has an emitting layer, a light guiding layer, a flexible transparent layer and a light source. The emitting layer has a first circuit. The light guiding layer located on one side of the emitting layer has a second circuit and a receiving space. The receiving space is concavely or thoroughly disposed on the light guiding layer. The flexible transparent layer disposed between the emitting layer and the light guiding layer, has a through hole and a receiving hole. The through hole is relative in position to the first circuit and the second circuit, and in the through hole, the first circuit and the second circuit may contact when the flexible transparent layer is compressed. The light source is disposed on the emitting layer and penetrating the receiving hole and protruding into the receiving space.

20 Claims, 4 Drawing Sheets

Related U.S. Application Data which is a continuation-in-part of application No. 15/210,875, filed on Jul. 14, 2016, now Pat. No. 9,568,666, which is a continuation-in-part of application No. 14/838,289, filed on Aug. 27, 2015, now Pat. No. 9,429,697, and a continuation-in-part of application No. 14/838,380, filed on Aug. 28, 2015, now Pat. No. 9,429,702.

(51) Int. Cl.
*H01H 13/83* (2006.01)
*H01H 13/703* (2006.01)

(52) U.S. Cl.
CPC ....... *H01H 13/703* (2013.01); *H01H 2209/06* (2013.01); *H01H 2239/022* (2013.01)

(56) References Cited

U.S. PATENT DOCUMENTS

| | | | |
|---|---|---|---|
| 2007/0046637 A1* | 3/2007 | Choo | G06F 3/0202 345/169 |
| 2009/0073347 A1* | 3/2009 | Takahashi | G02B 6/002 349/65 |

* cited by examiner

TOUCH-SENSITIVE LIGHT GUIDE FILM, AND GLOWING KEYBOARD AND ELECTRICAL DEVICE USING THE SAME

CROSS-REFERENCE TO RELATED APPLICATION

This application is a continuation-in-part application of and claims the priority benefits of U.S. prior application Ser. No. 15/390,546, filed on Dec. 26, 2016, now pending. The prior application Ser. No. 15/390,546 is a continuation-in-part application of and claims the priority benefits of U.S. prior application Ser. No. 15/210,875, filed on Jul. 14, 2016, now patented as U.S. Pat. No. 9,568,666. The prior application Ser. No. 15/210,875 is a continuation-in-part application of and claims the priority benefits of U.S. prior application Ser. No. 14/838,289, filed on Aug. 27, 2015, now patented as U.S. Pat. No. 9,429,697, and U.S. prior application Ser. No. 14/838,380, filed on Aug. 28, 2015, now patented as U.S. Pat. No. 9,429,702.

TECHNICAL FIELD

The present disclosure relates to a light guide film, especially to a light guide film that integrates light sources and a touch-sensitive circuit.

RELATED ART

A light guiding plate is one of main components of a backlight module, and the backlight module is an essential light source to a liquid crystal display (LCD). In recent years, the light guiding plate is also applied in a kind of display screen of electronic paper such as electrophoretic display (EPD), and particularly referred as a front-light plate. Because EPD requires an ambient light source to become visible, the front-light plate is paved on the EPD to instead of ambient light when in the dark.

In addition, the light guiding plate is also used in a glowing keyboard. For example, disclosed in U.S. Pat. No. 8,097,822 is a typical glowing keyboard. The method for manufacturing the glowing keyboard is to pave a light guiding plate on a base of a keyboard, produce holes on the light guiding plate for keycap structures penetrating and engaging on the base, and pave a pressing control circuit module with three films in stack on the light guiding plate. The method can provide light to four corners of each keycap by integrating few LEDs and the light guiding plate. The latest advance product of the glowing keyboard, for example, disclosed in U.S. Pat. No. 9,449,772 is a key mechanism for a keyboard. To decrease the entire thickness of the keyboard, a keycap mechanism includes a butterfly hinge used to instead of a traditional scissor hinge, and each keycap mechanism is provided with several light guiding panels and LEDs to instead of a light guiding plate. The method for manufacturing the key mechanism can decrease the entire thickness of the keyboard but increase the cost for manufacturing and assembling LEDs and the light guiding panels.

SUMMARY

The present disclosure provides a touch-sensitive light guide film that integrates light sources, a light guiding structure and a touch-sensitive circuit into a light guiding plate with a film shape. The touch-sensitive light guide film can provide the electrical products with the function of transmitting signal and integral lighting without providing an additional pressing control circuit module on the light guiding plate.

According to an aspect of the present disclosure, a touch-sensitive light guide film comprises an emitting layer, a light guiding layer, a flexible transparent layer and at least one light source. The emitting layer has a first circuit. The light guiding layer is located on one side of the emitting layer, and the light guiding layer has a second circuit and a receiving space. The second circuit is relative in position to the first circuit. The receiving space is concavely or thoroughly disposed on the light guiding layer. The flexible transparent layer is disposed between the emitting layer and the light guiding layer, and the flexible transparent layer has a through hole and a receiving hole. The through hole is relative in position to the first circuit and the second circuit, the first circuit and the second circuit may selectively electrical connect to each other. For instance, in the through hole, the first circuit and the second circuit may contact when the flexible transparent layer is compressed. The receiving hole is relative in position to the receiving space. The light source is disposed on the emitting layer and penetrating the receiving hole and protruding into the receiving space of the light guiding layer for providing light to the light guiding layer.

Accordingly, in the aspect, the touch-sensitive light guide film integrates a light guiding plate and a touch-sensitive circuit to have functions of surface source lighting and circuit controlling. For consumer electronics that regard visual effect highly, the touch-sensitive light guide film can effectively reduce the structural complexity of the product and save the space that is occupied by the light guiding plate.

In an aspect, the light source is an indicating light source. In other words, many light sources may be designed on the touch-sensitive light guide film, some for indication and others for illumination. In detail, the light color of each of the indicating light sources may be different.

In addition, the touch-sensitive light guide film may comprise a third circuit connecting to and controlling the light source for lighting. In another aspect, the third circuit can be connected to the first circuit or the second circuit whereby the first circuit or the second circuit may control the light source for lighting.

Furthermore, the light guiding layer may have a taper formed at the lateral side of the receiving space. In other words, the light guiding layer is gradually thicken to form a taper at the position relative to the light source, and the cross section of the taper is trumpet-shaped. Accordingly, the light guiding layer can increase a light receiving area by the taper to enhance the light guiding effect of the touch-sensitive light guide film. Further, the area of the cross section of the receiving hole is greater than the area of the cross section of the receiving space, so as for the receiving hole to receive the taper.

It is another aspect of the present disclosure to provide a glowing keyboard comprising a plurality of keycap members, a frame, a touch-sensitive light guide film as mentioned in the above aspects and a bottom plate. The frame has a plurality of slots for receiving the keycap members. The touch-sensitive light guide film is located under the frame and compressed by the keycap members so that the first circuit and the second circuit are in connect. Also, the emitting layer of the touch-sensitive light guide film provides light to each of the keycap members. The bottom plate is located under the touch-sensitive light guide film, and the bottom plate has a reflecting surface that is relative in position to the light guiding layer.

The other aspect of the present disclosure to provide an electrical device comprising a main body and a touch-sensitive light guide film disposed on the main body. Technical features of the touch-sensitive light guide film in the aspect of the glowing keyboard and the electrical device are described as the above aspect so the repeated description is omitted. As the touch-sensitive light guide film is used in the glowing keyboard, each of the first circuit and the second circuit can directly be used as a circuit for transmitting the signal of each of keys. Meanwhile, as the touch-sensitive light guide film is used in the electrical device, each of the first circuit and the second circuit can directly be used as a touch sensor for transmitting the signal of finger pressing. Also, the touch-sensitive light guide film integrates the first circuit and the second circuit to reduce the weight and volume of electrical products without providing an additional light guiding plate structure on the glowing keyboard.

The touch-sensitive light guide film comprises a plurality of the light sources, and the light color of each of the light sources may be different. The touch-sensitive light guide film may comprise a third circuit connecting to and controlling the light source for lighting. Alternatively, the third circuit can be connected to the first circuit or the second circuit whereby the first circuit or the second circuit may control the light source for lighting. The light guiding layer of the touch-sensitive light guide film is gradually thicken to form a taper at the position relative to the light source, and the cross section of the taper is trumpet-shaped. Further, the area of the cross section of the receiving hole of the flexible transparent layer is greater than the area of the cross section of the receiving space, so as for the receiving hole to receive the taper.

Technical features and effects of the touch-sensitive light guide film in the aspect are described as the above aspect so the repeated description is omitted.

DETAILED DESCRIPTION OF THE PREFERRED EMBODIMENTS

The objects, features and effects of the present disclosure will be apparent from the following detailed description for the specific embodiments when read in conjunction with the accompanying drawings.

Figure 1:
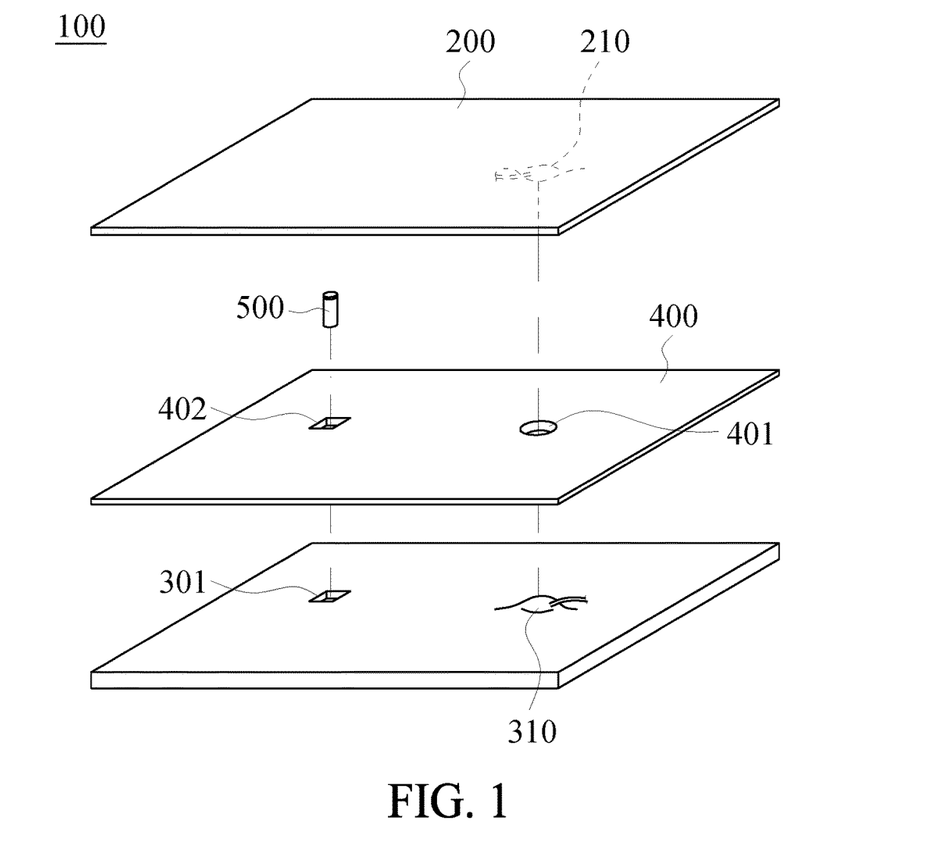
FIG. 1 is an exploded view of a touch-sensitive light guide film of an embodiment of the present disclosure.
Figure 2:
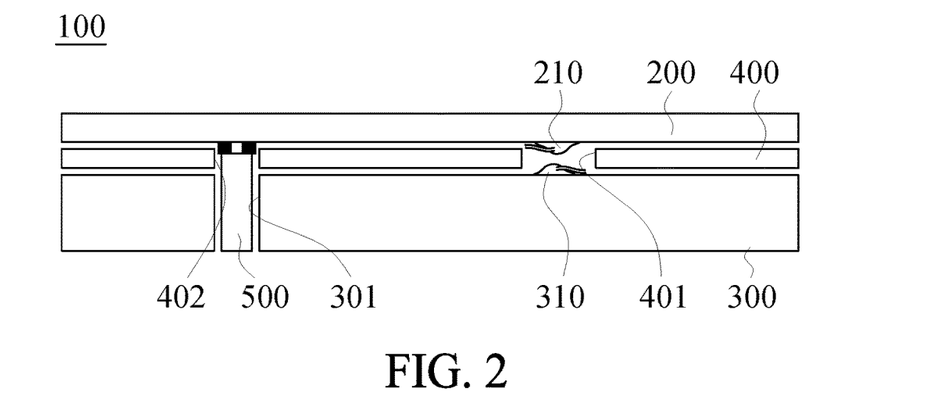
FIG. 2 is a side view of the touch-sensitive light guide film of FIG. 1.

Please refer to FIG. 1 and FIG. 2. A touch-sensitive light guide film 100 comprises an emitting layer 200, a light guiding layer 300, a flexible transparent layer 400 and at least one light source 500. The emitting layer 200 has a first circuit 210. The light guiding layer 300 is located on one side of the emitting layer 200, and the light guiding layer 300 has a second circuit 310. The flexible transparent layer 400 is disposed between the emitting layer 200 and the light guiding layer 300, and the flexible transparent layer 400 has a through hole 401. The through hole 401 is relative in position of a thickness direction of the touch-sensitive light guide film 100 to the first circuit 210 and the second circuit 310, and thus the first circuit 210 and the second circuit 310 may contact with each other due to a decreased thickness of the flexible transparent layer 400 when the flexible transparent layer 400 is compressed by two sides from the emitting layer 200 and the light guiding layer 300. When the compression force is removed, the flexible transparent layer 400 may elastically recover to an original position so that the first circuit 210 and the second circuit 310 are separated again, and thus the touch-sensitive light guide film 100 has a signal transmission function.

The light guiding layer 300 also has a receiving space 301, and the flexible transparent layer 400 further has a receiving hole 402 that is relative in position to the receiving space 301. The light source 500 is disposed on the emitting layer 200, and the light source 500 is relative in position to the receiving space 301 and the receiving hole 402 to penetrate the receiving hole 402 and protrude into the receiving space 301 for providing light to the light guiding layer 300.

The material of the emitting layer 200, the light guiding layer 300 and the flexible transparent layer 400 may use plastic materials of PC, PET and PC in sequence to prevent a problem of adhesion that is caused by placing the films with the same material in stack. Regarding the thickness consideration, the emitting layer 200 is used to mount the first circuit 210, and the entire surface of the emitting layer 200 has to keep complete and flat except it is applied in a glowing keyboard to have a hole. The emitting layer 200 is responsible for emitting light, not for guiding light, and thus the entire thickness is up to 0.05 mm through 0.1 mm, and the current test sample of the emitting layer 200 has a thickness of 0.075 mm.

The main function of the flexible transparent layer 400 is to provide the through hole 401 and rebounding force, and the current test sample of the flexible transparent layer 400 can work only with a thickness of 0.05 mm. In order to further increase the rebounding force, a protrusion can be located surrounding the through hole 401. In an example of the application of the glowing keyboard, there are over four hundred the through holes 401 and holes on a surface of the flexible transparent layer 400. When each through hole 401 is provided with a protrusion around, the protrusion can support between the flexible transparent layer 400 and the emitting layer 200 to produce an air gap for solving the problem of adhesion.

Moreover, even though the flexible transparent layer 400, the light guiding layer 300 and the emitting layer 200 are the same PC or PET material, the problem of adhesion with each other can be solved by the air gap. The thickness of the flexible transparent layer 400 is only 0.05 mm, and the protrusion is thinner than thereof, so that the protrusion is not easy to form by injection molding. Practically, the protrusion may be formed by optical clear adhesive (OCA).

The main function of the light guiding layer 300 is to transmit light of the light source 500, and the light guiding layer 300 used in the general LED has a thickness about 0.4 mm, and exclusively used in the LED for a glowing keyboard has a thickness down to 0.3 mm. In view of the design for the thickness of the light guiding layer 300, the embossing method is currently used to apply optical dots on a light guiding plate with a thickness of 0.1 mm through 0.3 mm.

Specifically, in case the optical dots are applied on a light guiding plate with a thickness less than 0.1 mm, the photolithography of semiconductor process is necessary. On the contrary, in case the optical dots are applied on a light guiding plate with a thickness more than 1 mm, the extrusion method is suitable. However, it is necessary for the embossing method to firstly select a range of thickness, and then design and manufacture roller sets and machine components as prescribed specifications, and the embossing method fails to suit a light guiding plate that is too thin or too thick.

In view of the optical application, the light guiding layer 300 is provided with the optical dots thereon, so the light can be uniformly guided out to an upper surface, and penetrate the flexible transparent layer 400 and the emitting layer 200 to form a surface light source by the principle of the dot design with different density, depth and shape and damaging the total reflection. In the application of a glowing keyboard, the uniformity of the glowing keyboard fails to rival the specifications of display screen backlight module because the glowing keyboard has too many holes, but it can be improved by the shelter of keycaps and frame, and it is doable as long as the uniformity of the positions among keys and four corners of the glowing keyboard is sure. On the other hand, if the touch-sensitive light guide film 100 is not used in the glowing keyboard, the hole problem of the light guiding layer 300 may be played down, but it is necessary to improve the optical level of the emitting layer 200, for example the entire surface of the emitting layer 200 has to keep complete and flat, or a cover is further provided to produce light hazing and physical protective function.

Figure 3A:
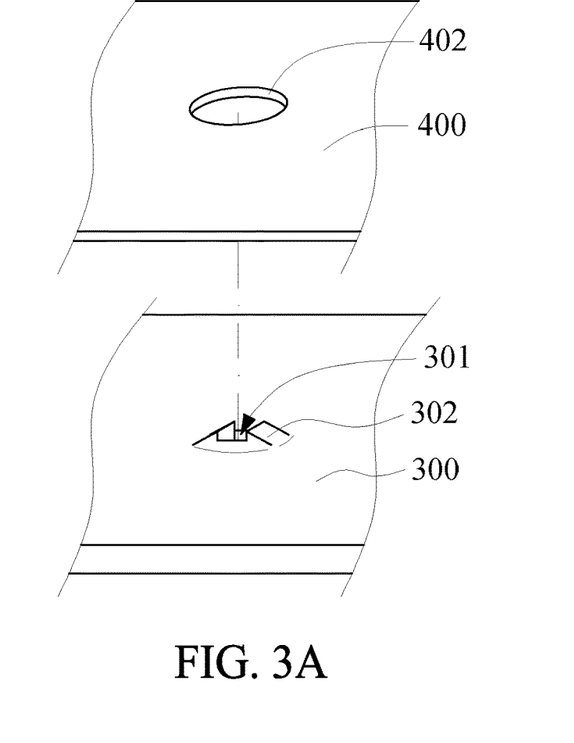
FIG. 3A is a schematic view of a receiving hole and a taper of the touch-sensitive light guide film of FIG. 1.
Figure 3B:
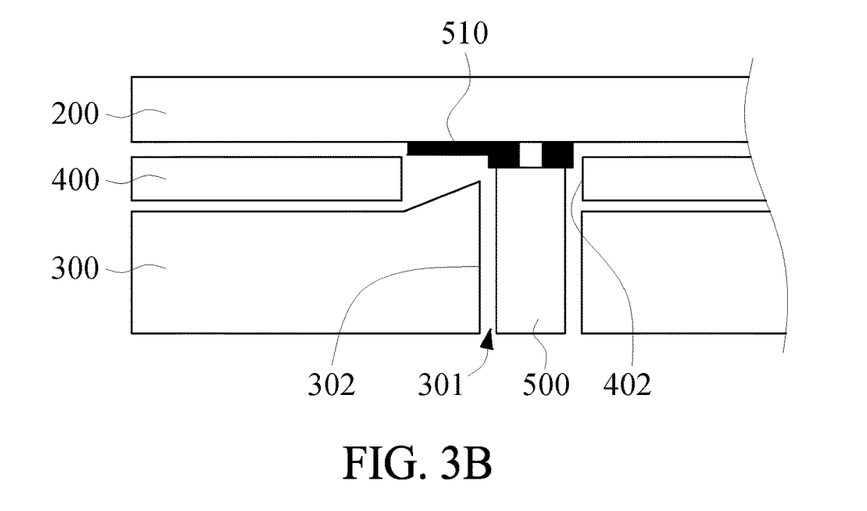
FIG. 3B is a schematic view of a taper and a light source being relative in position to the taper of the touch-sensitive light guide film of FIG. 1.

Please refer to FIG. 3A and FIG. 3B together. The light guiding layer 300 is gradually thicken to form a taper 302 at the position relative to the light source 500, and the cross section of the taper 302 is trumpet-shaped. As depicted in FIG. 3A, the area of the cross section of the receiving hole 402 is greater than the area of the cross section of the receiving space 301, so as for the receiving hole 402 to receive the taper 302. In the embodiment, the entire thickness of the touch-sensitive light guide film 100 can further be reduced. In an example of test sample, the thickness of the light guiding layer 300 is 0.15 mm, and the thickness of the taper 302 is increased to 0.3 mm for allowing the thickness of the taper 302 and that of LED of the glowing keyboard to match each other.

In the embodiment of FIG. 3B, the touch-sensitive light guide film 100 may comprise a third circuit 510 connecting to and controlling the light source 500 for lighting. In another embodiment, the third circuit 510 can be connected to the first circuit 210 or the second circuit 310 whereby the first circuit 210 or the second circuit 310 may control the light source 500 for lighting. Specifically, in the application of non-glowing keyboard, it is not necessary to ensure that the emitting light 500 is continuously glowing. For example, when the first circuit 210 and the second circuit 310 are conducted by finger pressing, the finger has already covered the glowing area around, and it does not make sense in lighting the light source 500, and thus the conduction of the first circuit 210 and the second circuit 310 can be used to bypass the electricity of the light source 500.

Figure 4A:
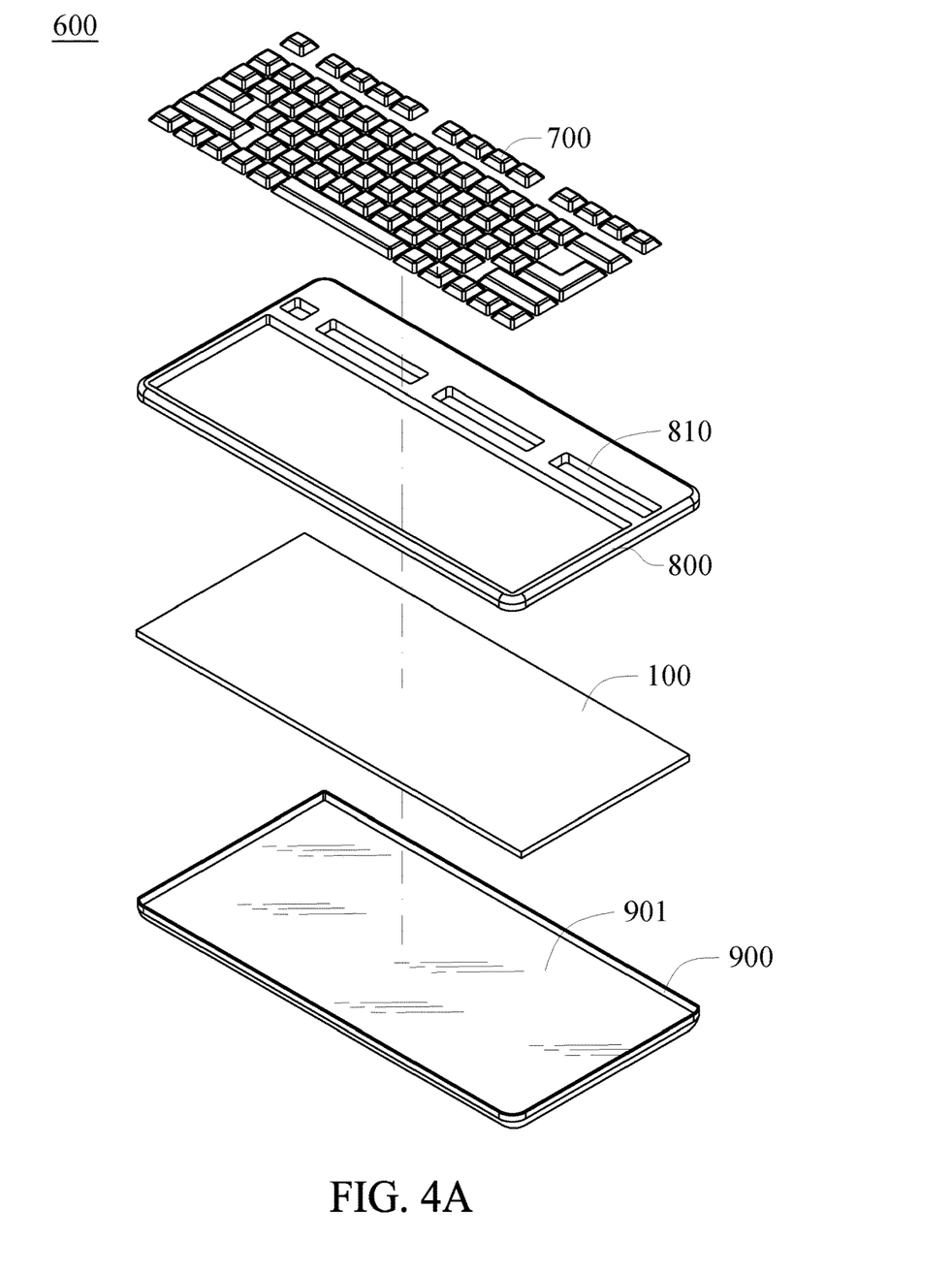
FIG. 4A is an exploded view of a glowing keyboard of an embodiment of the present disclosure.
Figure 4B:
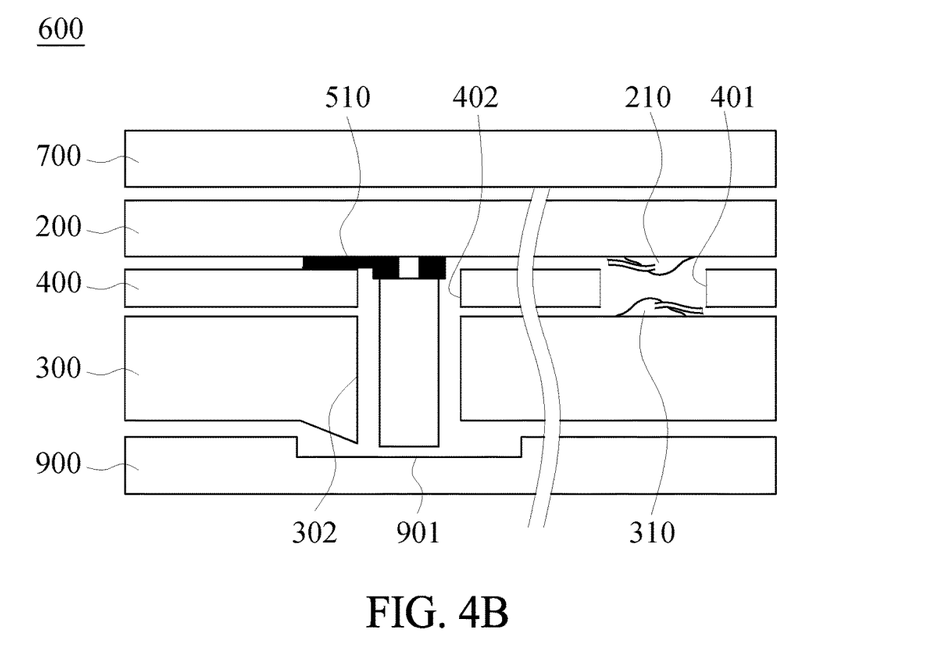
FIG. 4B is a side view of the glowing keyboard of FIG. 4A.

Please refer to FIG. 4A and FIG. 4B. It is another embodiment of the present disclosure to provide a glowing keyboard 600 comprising a plurality of keycap members 700, a frame 800, a touch-sensitive light guide film 100 as mentioned in the above embodiments and a bottom plate 900. The frame 800 has a plurality of slots 810 for receiving the keycap members 700. The touch-sensitive light guide film 100 is located under the frame 800 and compressed by the keycap members 700 so that the first circuit 210 and the second circuit 310 are in connect. The bottom plate 900 is located under the touch-sensitive light guide film 100, and the bottom plate 900 has a reflecting surface 901. The reflecting surface 901 may receive the light from the light guiding layer 300 and reflect the light to the emitting layer 200, so as to allow the emitting layer 200 to provide light to the keycap members 700.

Accordingly, the glowing keyboard 600 can use the touch-sensitive light guide film 100 to achieve the function of transmitting signal and emitting light without providing an additional light guiding plate to the glowing keyboard 600. In addition, in the application of the glowing keyboard 600, to provide the keycap members 700 and the frame 800 can produce a function of covering the emitting layer 200 to improve the optical level.

As depicted in FIG. 3B, the thickness of the light guiding layer 300 can be increased toward the emitting layer 200. Alternatively, in the embodiment of FIG. 4B, the thickness of the light guiding layer 300 can be increased toward the bottom plate 900, and thus the area of the cross section of the receiving hole 402 is not necessary to greater than the area of the cross section of the receiving space 301. Still alternatively, as depicted in FIG. 2, the thickness of the light guiding layer 300 is uniform and not increased toward the emitting layer 200 or the bottom plate 900. The design for the thickness of the light guiding layer 300 may be decided by the practical need, but not used to limit the scope of the present disclosure. For example, in order to increase the light guiding effect of the touch-sensitive light guide film 100, one of the methods is provided that the thickness of the light guiding layer 300 increases toward the emitting layer 200 to increase a light receiving area by the taper 302 as the design way of the light guiding layer 300 in FIG. 3B.

Other embodiments of the touch-sensitive light guide film 100 relating to the glowing keyboard 600 of the embodiment are described as the above embodiments so the repeated description is omitted.

Figure 5:
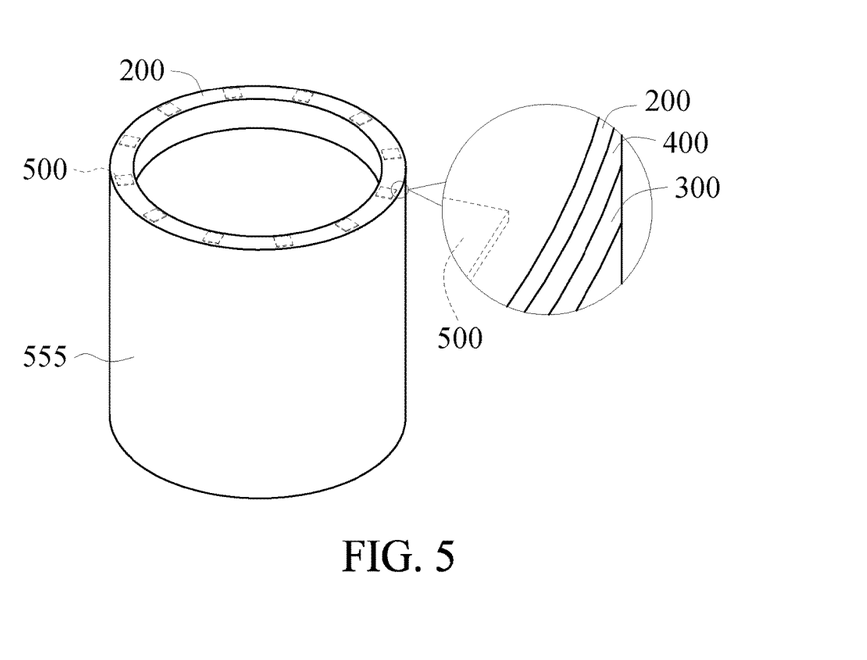
FIG. 5 is a schematic view of the application of the touch-sensitive light guide film of FIG. 1.

In another embodiment, the touch-sensitive light guide film 100 or the glowing keyboard 600 may comprise a plurality of the light sources 500, and the light color of each of the light sources 500 is different. As depicted in FIG. 5, the other embodiment of the present disclosure is to provide an electrical device. The electrical device includes a main body 555 (such as, a stereo, but the present disclosure is not limited thereto) and a touch-sensitive light guide film. The touch-sensitive light guide film 100 may be disposed on the top surface of the main body 555, or shaped as a circle to surround the lateral wall of the main body 555.

For instance, the touch-sensitive light guide film 100 may be a circular surface light source. In detail, the touch-sensitive light guide film 100 may be provided on the surface of the main body 555 such as the stereo and the cosmetic mirror, and achieve other functions of command feedbacking or situation changing by the light sources 500 with different light colors. For example, in the application of the lighting ring, a plurality of LEDs can provide the light of basic color, the first circuit 210 and the second circuit 310 are provided in pairs and located around the third circuit 510 and the light source 500 that is corresponding to the third circuit 510. As the light source 500 provides a light other than the light of basic color to indicate a user, the user can carry out a corresponding operation by pressing to conduct the first circuit 210 and the second circuit 310.

With the description of the above embodiments, the present disclosure provides the touch-sensitive light guide film 100 which has functions of surface source lighting and circuit controlling, and the touch-sensitive light guide film 100 can be used in a variety of electrical products, such as glowing keyboard and the like. In addition, the present disclosure integrates the light guiding plate into the film to reduce the structural complexity of the electrical product as well as the volume of the electrical product.

It is to be understood by the those of ordinary skill in the art that the above description and the preferable embodiments of the present disclosure made only by way of example and not as a limitation of the scope of the present disclosure. Please note that the equivalent modifications and alternations of the embodiments could be intended to be embraced in the scope of the present disclosure. Therefore, the scope of the present disclosure is based on the claims as defined.

What is claimed is:

1. A touch-sensitive light guide film, comprising:
   an emitting layer having a first circuit;
   a light guiding layer located on one side of the emitting layer, the light guiding layer having:
      a second circuit being relative in position to the first circuit; and
      a receiving space concavely or thoroughly disposed on the light guiding layer;
   a flexible transparent layer disposed between the emitting layer and the light guiding layer, the flexible transparent layer having:
      a through hole being relative in position to the first circuit and the second circuit, and thus enabling the first circuit to selectively electrical connect the second circuit; and
      a receiving hole being relative in position to the receiving space; and
   a light source disposed on the emitting layer, the light source penetrating the receiving hole and protruding into the receiving space to provide light to the light guiding layer.

2. The touch-sensitive light guide film of claim 1, wherein the light source is an indicating light source.

3. The touch-sensitive light guide film of claim 1, further comprising a third circuit connecting to and controlling the light source for lighting.

4. The touch-sensitive light guide film of claim 1, further comprising a taper formed at the lateral side of the receiving space.

5. The touch-sensitive light guide film of claim 4, wherein the area of the cross section of the receiving hole is greater than the area of the cross section of the receiving space, so as for the receiving hole to receive the taper.

6. The touch-sensitive light guide film of claim 1, wherein the thickness of the emitting layer is 0.05 mm through 0.1 mm.

7. The touch-sensitive light guide film of claim 1, further comprising a plurality of protrusion located surrounding the through hole of the flexible transparent layer.

8. The touch-sensitive light guide film of claim 1, further comprising a plurality of protrusion located surrounding the receiving hole of the flexible transparent layer.

9. The touch-sensitive light guide film of claim 1, wherein the thickness of the light guiding layer is 0.1 mm through 0.3 mm.

10. A glowing keyboard, comprising:
    a plurality of keycap members;
    a frame having a plurality of slot for receiving the keycap members;
    a touch-sensitive light guide film, comprising:
       an emitting layer have a first circuit;
       a light guiding layer located on one side of the emitting layer, the light guiding layer having:
          a second circuit being relative in position to the first circuit; and
          a receiving space concavely or thoroughly disposed on the light guiding layer;
       a flexible transparent layer disposed between the emitting layer and the light guiding layer, the flexible transparent layer having:
          a through hole being relative in position to the first circuit and the second circuit, in the through hole, the first circuit and the second circuit being contact when the flexible transparent layer is compressed; and
          a receiving hole being relative in position to the receiving space; and
       a light source disposed on the emitting layer, the light source penetrating the receiving hole and protruding into the receiving space to provide light to the light guiding layer;
    the touch-sensitive light guide film being located under the frame and compressed by the keycap members so that the first circuit and the second circuit are in connect, and the emitting layer providing light to the keycap members; and
    a bottom plate located under the touch-sensitive light guide film, the bottom plate having a reflecting surface being relative in position to the light guiding layer.

11. The glowing keyboard of claim 10, wherein the light source is an indicating light source.

12. The glowing keyboard of claim 10, further comprising a third circuit connecting to and controlling the light source for lighting.

13. The glowing keyboard of claim 10, further comprising a taper formed at the lateral side of the receiving space.

14. The glowing keyboard of claim 13, wherein the area of the cross section of the receiving hole is greater than the area of the cross section of the receiving space, so as for the receiving hole to receive the taper.

15. The glowing keyboard of claim 10, wherein the thickness of the emitting layer is 0.05 mm through 0.1 mm.

16. The glowing keyboard of claim 10, further comprising a plurality of protrusion located surrounding the through hole of the flexible transparent layer.

17. The glowing keyboard of claim 10, further comprising a plurality of protrusion located surrounding the receiving hole of the flexible transparent layer.

18. The glowing keyboard of claim 10, wherein the thickness of the light guiding layer is 0.1 mm through 0.3 mm.

19. An electrical device, comprising:
    a main body; and
    a touch-sensitive light guide film disposed on the main body, comprising:
       an emitting layer have a first circuit;
       a light guiding layer located on one side of the emitting layer, the light guiding layer having:
          a second circuit being relative in position to the first circuit; and
          a receiving space concavely or thoroughly disposed on the light guiding layer;
       a flexible transparent layer disposed between the emitting layer and the light guiding layer, the flexible transparent layer having:
          a through hole being relative in position to the first circuit and the second circuit, in the through hole, the first circuit and the second circuit being contact when the flexible transparent layer is compressed; and a receiving hole being relative in position to the receiving space; and a light source disposed on the emitting layer, the light source penetrating the receiving hole and protruding into the receiving space to provide light to the light guiding layer.

20. The electrical device of claim 19, wherein the light source is an indicating light source.

* * * * *